United States Patent
White et al.

(10) Patent No.: US 7,880,434 B2
(45) Date of Patent: Feb. 1, 2011

(54) SYSTEM FOR BALANCING A PLURALITY OF BATTERY PACK SYSTEM MODULES CONNECTED IN SERIES

(75) Inventors: David Allen White, Houston, TX (US); Claude Leonard Benckenstein, Jr., Sugar Land, TX (US)

(73) Assignee: Southwest Electronic Energy Corporation, Stafford, TX (US)

( * ) Notice: Subject to any disclaimer, the term of this patent is extended or adjusted under 35 U.S.C. 154(b) by 0 days.

(21) Appl. No.: 12/417,435

(22) Filed: Apr. 2, 2009

(65) Prior Publication Data

US 2009/0289599 A1 Nov. 26, 2009

Related U.S. Application Data

(60) Provisional application No. 61/054,882, filed on May 21, 2008.

(51) Int. Cl.
*H02J 7/00* (2006.01)
(52) U.S. Cl. .................. 320/119; 320/116; 320/134
(58) Field of Classification Search .................. 320/112, 320/116, 119, 124, 128, 132, 136, 122
See application file for complete search history.

(56) References Cited

U.S. PATENT DOCUMENTS

| | | | | |
|---|---|---|---|---|
| 5,710,501 A | * | 1/1998 | van Phuoc et al. .......... | 307/150 |
| 5,952,815 A | * | 9/1999 | Rouillard et al. ............ | 320/116 |
| 6,157,169 A | * | 12/2000 | Lee ............................ | 320/132 |
| 6,160,375 A | * | 12/2000 | Horie et al. .................. | 320/116 |
| 7,486,050 B2 | * | 2/2009 | Hidaka et al. ................ | 320/134 |
| 7,755,326 B1 | * | 7/2010 | Thivierge .................... | 320/116 |
| 2002/0171390 A1 | * | 11/2002 | Kruger et al. ................ | 320/103 |
| 2008/0252263 A1 | * | 10/2008 | Funabashi et al. ........... | 320/154 |
| 2009/0251100 A1 | * | 10/2009 | Incledon et al. ............. | 320/106 |

* cited by examiner

*Primary Examiner*—Edward Tso
*Assistant Examiner*—Arun Williams
(74) *Attorney, Agent, or Firm*—Fulbright & Jaworski L.L.P.

(57) ABSTRACT

A system for balancing a plurality of battery pack system modules connected in series comprising: a plurality of battery pack system modules, wherein a high charge module of the plurality of battery pack system modules has a charge greater than a that of other modules. At least one zener diode connected in series with a current limiting resistor is connected in parallel to the plurality of battery pack system modules. A power source is in communication with a disconnect circuit of at least one of the battery pack system modules. The disconnect circuit is actuated when the battery pack system module reaches a predetermined state of charge. The zener diode enables current from the power source to bypass charged battery pack system modules to charge other battery pack system modules.

16 Claims, 6 Drawing Sheets

SYSTEM FOR BALANCING A PLURALITY OF BATTERY PACK SYSTEM MODULES CONNECTED IN SERIES

CROSS REFERENCE TO RELATED APPLICATIONS

The present application claims priority to co-pending U.S. Provisional Application Ser. No. 61/054,882 filed on May 21, 2008, entitled "System for Balancing Battery Pack System Modules" and is incorporated herein.

FIELD

The present embodiments generally relate to a system for balancing a plurality of battery pack system modules.

BACKGROUND

A need exists for a system for balancing battery pack system modules that balances states of charge of the battery pack system modules automatically, without requiring manual balancing during maintenance operations.

A further need exists for a system for balancing battery pack system modules in which each battery pack system module is independently self-balancing, without requiring communication with a master controller or other battery pack system modules, obviating the need for a costly centralized master controller, and the need for complex interconnection between battery pack system modules.

A need also exists for a system for balancing battery pack system modules that enables individual battery pack system modules and groups of battery pack system modules to be selectively removable and replaceable, without interrupting charging of other battery pack system modules.

The present embodiments meet these needs.

BRIEF DESCRIPTION OF THE DRAWINGS

The detailed description will be better understood in conjunction with the accompanying drawings as follows.

Figure 1:
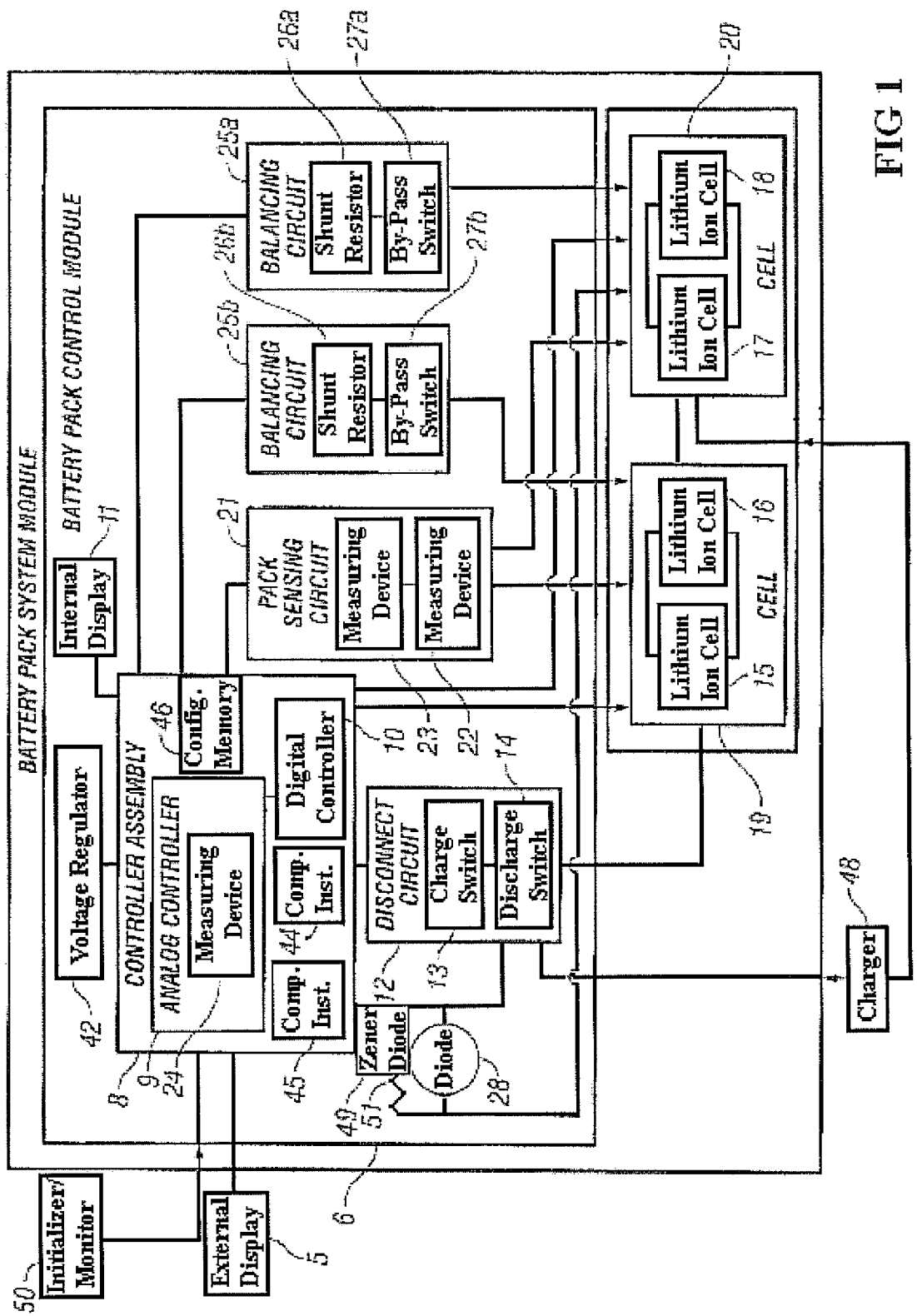
FIG. 1 depicts a diagram of an embodiment of a battery pack system module useable with the present system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system for balancing a plurality of battery pack system modules, which can be connected in series. The present system can also be useable to balance multiple groups of battery pack system modules connected in parallel. Each group of parallel battery pack system modules can be connected to other groups of battery pack system modules in series.

In conventional systems, when a single battery pack system module within a system of battery pack system modules connected in series reaches a predetermined state of charge, a disconnect circuit within the battery pack system module is actuated, preventing current from charging any other battery pack system modules within the battery pack system.

This inability to charge other battery pack system modules can result in unbalanced battery pack systems, which can cause damage to the battery pack system modules and other equipment connected to the battery pack system. Additionally, the existence of overcharged and unbalanced battery pack system modules can present a safety hazard to personnel that operate on the battery pack system modules and any attached equipment.

Conventional battery pack system modules connected in series must therefore be balanced manually, by interrupting operation of equipment powered by the battery pack system, fully discharging each battery pack system module within the battery pack system, then simultaneously charging each battery pack system module. Manual balancing operations are tedious, time consuming, and costly, and are therefore typically undertaken no more often than once every six months.

These special maintenance operations are often not performed due to inattention to detail or a lack of time, manpower, or other resources necessary to perform the manual balancing operations. Failure to perform these balancing operations can allow individual battery pack system modules within a group of modules connected in series to attain unbalanced states of charge, potentially damaging one or more parts of the modules and any connected equipment, and creating a safety hazard to operators of the battery pack system modules and connected equipment.

The present system advantageously enables a plurality of battery pack system modules, which can be connected in series to independently and automatically attain a balanced state of charge during a normal charge phase, without requiring separate special maintenance operations. Through use of the present system, the costly and time consuming needs for manual balancing of the battery pack system modules is removed entirely.

The present system can use zener diodes connected in series with current limiting resistors to enable current from a power source to automatically bypass battery pack system modules that have attained a predetermined state of charge. By enabling the bypass of charged battery pack system modules, the zener diodes enable the charging of other battery pack system modules connected in series within a system that have not yet attained the predetermined state of charge. The present system thereby automatically creates a balanced state of charge within the battery pack system once each battery pack system module has attained the predetermined state of charge.

Additionally or alternatively, the present system can utilize computer instructions for measuring the state of charge of a battery pack system module, disconnecting a charge switch, and actuating shunt resistors within balancing circuits to partially discharge battery pack system modules that have attained a predetermined high state of charge. The shunting of the battery pack system modules can be performed until the modules reach a hysteresis state of charge, at which time the charge switch can be reconnected, and charging of the battery pack system can resume.

By automatically partially discharging battery pack system modules that have reached the predetermined high state of charge, the simultaneous charging of each module within a battery pack system can be continued without exceeding the predetermined high state of charge in any battery pack system module.

This embodiment of the present system produces an oscillating state of charge within the battery pack system modules, whereby once a battery pack system module has attained a predetermined high state of charge, the battery pack system module is partially discharged, then charged simultaneously with other battery pack system modules connected in series. Once all battery pack system modules within a battery pack system are charged to the predetermined high state of charge, creating a balanced system, it can be contemplated that all of the battery pack system modules exhibit an oscillating state of charge simultaneously, through partial discharge using the balancing circuits, then simultaneous charging from a power source.

It is contemplated that in an embodiment, the use of computer instructions to automatically cause the partial discharge of battery pack system modules that have reached a predetermined high state of charge can be coupled with use of zener diodes connected to current limiting resistors. Using this embodiment, during discharge of a charged battery pack system module, current can continue to charge other battery pack system modules connected in series by bypassing the discharging module through use of a zener diode, providing enhanced efficiency over the use of zener diodes or partial discharge alone.

The present system can provide the advantage of enabling constant and continuous balancing of a plurality of battery pack system modules connected in series, automatically, each time a battery pack system is charged. Typical balancing operations are only performed once every six months, or even less frequently, generating a greater risk that a battery pack system will become unbalanced as time passes.

By enabling automatic balancing of a plurality of battery pack system modules connected in series, use of a battery pack system module balancing resistor, typically required for conventional balancing operations, is not necessary. Attachment of a balancing resistor can be disruptive to normal operation of a battery pack system.

Conventional systems require that each battery pack system module within a system communicates with one another through complex interconnections, or through a costly centralized master controller. The present system can enable each battery pack system module to independently attain a balanced state of charge with other battery pack system modules connected in series, without requiring centralized monitoring or control, and without requiring any of the battery pack system modules to communicate with any other module.

The present system thereby provides the benefit of increased battery pack system design flexibility, while retaining battery pack system module balance. Because each battery pack system module can be independent of one another, battery pack system modules within a battery pack system can be removed and reconfigured in a modular fashion, allowing nearly unlimited flexibility in battery pack system design configurations.

The present system further provides the advantage of enabling battery pack system modules to be charged to a predetermined state of charge, such as about 80 percent of the maximum capacity for each battery pack system module. By permitting balancing of battery pack system modules at selected predetermined states of charge, the lifespan of cells within each battery pack system module can be prolonged significantly. Typical rechargeable cells can be fully charged to their maximum capacity, then fully discharged, approximately 1,000 times. By charging and balancing at a predetermined state of charge, using the present system, each cell can be contemplated to have a life expectancy ranging from about 2,000 charging cycles to about 10,000 charging cycles, or more.

Additionally, maintaining a battery pack system module's cells at a predetermined level of charge, such as about 80 percent of maximum capacity, can increase useable life for a battery pack system module used in a mode where there are infrequent charge/discharge cycles, such as a back-up mode, from a typical useable life of about 1 year to about 2 years to a greater useable life of about 5 years to about 10 years.

Referring now to FIG. 1, a diagram of an embodiment of a battery pack system module useable with the present system is depicted.

The battery pack system module is depicted having a battery pack control module (6), which is useable to internally monitor and balance states of charge of a plurality of individual cells connected in series within the battery pack system module. The battery pack control module (6) is also useable to monitor and balance groups of cells connected in parallel, the groups of cells connected to other groups of cells in series.

The battery pack control module (6) includes a controller assembly (8) for measuring parameters and controlling a disconnect circuit (12) and balancing circuits (25a, 25b) responsive to parameters measured by the controller assembly (8) and a pack sensing circuit (21).

A voltage regulator (42), such as a DC programmable voltage regulator made by Linear Technology, Inc. of Malpitas, Calif., can be used to power the controller assembly (8).

The battery pack control module (6) is shown having a protective diode (28), which can be a reverse voltage protection diode or a bypass diode, useable to protect cells within the depicted battery pack system module from excessive voltage. Bypass diodes such as those manufactured by ON Semiconductor of Phoenix Ariz. or Vishay of Malvern, Pa. can be contemplated for use herein. The protective diode (28) can be connected to the disconnect circuit (12), and to a first group of cells (20).

For example, the protective diode (28) can prevent damage to the disconnect circuit (12) by shunting damaging negative voltage transients around the disconnect circuit (12).

The disconnect circuit (12) is depicted having a charge switch (13) and a discharge switch (14), which can be transistor switches, such as a Vishay P-FET switch, made by Vishay of Malvern, Pa., or similar types of switches. The disconnect circuit (12) can be in communication with a second group of cells (19).

The first group of cells (20) is shown having a first lithium ion cell (17) and a second lithium ion cell (18), which can be connected in parallel. The first group of cells (20) can be connected in series to the second group of cells (19). The second group of cells (19) is shown having a third lithium ion cell (15) and a fourth lithium ion cell (16), which can be connected in parallel.

While each group of cells (19, 20) is shown including two individual cells connected in parallel, it is contemplated that a group of cells can have any number of cells, such as from about one cell to about four cells, or more.

FIG. 1 depicts each of the cells (15, 16, 17, 18) as lithium ion cells, such as lithium ion cells having a nominal voltage of about 3.7 volts made by Tianjin Lishen Battery Joint-Stock Co. Ltd., of Tianjin Huayuan, China. It can be contemplated that the present system can be useable with any type of rechargeable cell, including nickel cadmium cells, nickel metal hydride cells, lead acid cells, and other similar rechargeable cells.

In an embodiment, one or more battery pack system modules can include one or more capacitors, one or more supercapacitors, one or more electrochemical cells, such as fuel cells, or combinations thereof, in addition to the plurality of cells (15, 16, 17, 18). The one or more capacitors, one or more supercapacitors, one or more electrochemical cells, or combinations thereof can also be included in place of the plurality of cells (15, 16, 17, 18).

A zener diode (49), such as a high power zener diode manufactured by ON Semiconductor of Phoenix, Ariz., can be connected in series with a current limiting resistor (51), such as a current limiting resistor having a power capability of five watts or more, manufactured by Vishay of Malvern, Pa. The zener diode (49) and current limiting resistor (51) can be connected in parallel to the protective diode (28) and can be in communication with the disconnect circuit (12).

It is contemplated that the zener diode (49) and current limiting resistor (51) can be disposed between adjacent battery pack system modules within a group of battery pack system modules connected in series. The zener diodes can be contemplated to permit the flow of current from a power source, shown in FIG. 1 as a charger (48) through a battery pack system module that has reached a predetermined state of charge without charging the battery pack system module, thereby allowing the charging of other battery pack system modules connected in series.

The zener diode (49) can permit the flow of current that would otherwise be stopped by actuation of the disconnect circuit (12), enabling charging of other battery pack system modules connected in series with the depicted battery pack system module. For example, when the disconnect circuit (12) is actuated, a current of 250 ma can be permitted to flow through the current limiting resistor (51) and the zener diode (49) to charge one or more adjacent battery pack system modules.

The controller assembly (8) is shown having an analog controller (9), such as Part Number BQ29312A, available from Texas Instruments of Dallas, Tex., and a digital controller (10). The digital controller (10) can include analog and digital input/output ports, a processor, which can be a microprocessor, memory, which can include flash memory and processing logic located in the memory, and computer instructions for executing balancing, measuring, charging, and discharge functions.

The analog controller (9) is shown having a measuring device (24), which can be contemplated to measure the voltage of individual cells or groups of cells within the battery pack system module, or the voltage of the entire battery pack system module.

The controller assembly (8) can be in communication with the pack sensing circuit (21), which is shown having a current measuring device (23) and a temperature measuring device (22). The voltage, current, and temperature measurements obtained using the measuring devices (22, 23) can be used by the digital controller (10) to obtain the state of charge of the battery pack system module. The state of charge can be related to voltage, current, and/or temperature as relative capacity through data tables within configuration memory (46).

It is contemplated that the pack sensing circuit (21) can measure temperatures ranging from about −50 degrees Centigrade to about 85 degrees Centigrade or more, current ranging from about 0 ma to about 16,000 ma or more, and voltage ranging from about 0 V to 18 about V or more.

The state of charge indicates the percent charge of the battery pack system module relative to the nominal maximum charge of the battery pack system module. The state of charge can also be measured as absolute capacity by additionally measuring the time average current into and out of the entire battery pack system module to obtain the number of amperage hours remaining in the battery pack system module.

In an embodiment, the measured state of charge of the battery pack system module can be an absolute state of charge determined by counting coulombs, such as an absolute capacity of 24 ampere hours based on the flow of coulombs from a power source.

The state of charge and status of the battery pack system module can be acquired and externally displayed using an initializer or display device (50), such as a monitor made by Hewlett Packard of Palo Alto, Calif., which can be in communication with the controller assembly (8).

The state of charge and status of the battery pack system module can be externally displayed using an external display device (5). The external display device (5) can include one or more light emitting diodes, such as 4 mm oval red LEDs made by Ledman Optoelectronic Co., Ltd., of China., a liquid crystal display, such as one made by Sony Electronics, Inc., a plasma display, such as one made by Ningbo Boigle Digital Technology Co., Ltd., of China, or combinations thereof. Use of a liquid crystal display can be contemplated to be advantageous for applications when lower power consumption is required, such as military applications.

An internal display (11), a liquid crystal display, a plasma display, or combinations thereof can be in communication with the controller assembly (8). The internal display (11) and the external display (5) can be useable separately or together to visibly display status and capacity parameters of the battery pack system module for use by operators and other users.

A first balancing circuit (25a) is shown having a first shunt resistor (26a) and a first by-pass switch (27a) can be in communication with the controller assembly (8) and the first group of cells (20). A second balancing circuit (25b) is shown having a second shunt resistor (26b) and a second by-pass switch (27b) can be in communication with the controller assembly (8) and the second group of cells (19). The by-pass switches (27a, 27b) can include semiconductor switches, variable resistors, mini-micro switches, or combinations thereof.

The balancing circuits (25a, 25b) can be contemplated to be useable to balance the states of charge of the groups of cells (19, 20). The balancing circuits (25a, 25b) can also be contemplated to be useable to at least partially discharge the depicted battery pack system module to facilitate balancing of a plurality of battery pack system modules connected in series.

FIG. 1 depicts a power source (48), which is shown as a charger, connected to the first group of cells (20) and to the disconnect circuit (12). The power source (48) can include any type of current limited and voltage limited power source, including one or more solar panels, fuel cells, or any other current limited power supply with voltage foldback, such as a Lambda GENH 40-19 or the equivalent.

The controller assembly (8) can include computer instructions (44), which can be stored in flash memory or using other means, for instructing the processor of the digital controller (10) to actuate and de-actuate the disconnect circuit (12) in response to voltage, current, and temperature measurements obtained from the measuring devices (22, 23, 24).

The computer instructions (44) can also instruct the processor of the digital controller (10) to actuate and de-actuate the balancing circuits (25a, 25b) and the disconnect circuit (12) to balance states of charge of the groups of cells (19, 20), allowing the safe charge and internal balancing of the cells within the depicted battery pack system module.

The controller assembly (8) can further includes configuration memory (46), such as flash memory, that can be loaded by the initializer or display device (50), that can contain battery pack system module design parameters, such as cell chemistry parameters, application parameters, charge parameters, discharge parameters, and other similar parameters. The provision of the configuration memory (46) can enable the designing of battery pack system modules with unique specifications and characteristics.

The controller assembly (8) can further includes computer instructions (45), which can be stored in flash memory, or using other means, which can be used to balance the state of charge of the depicted battery pack system module with that of other battery pack system modules connected to the depicted battery pack system module in series.

The computer instructions (45) can be contemplated to instruct the processor of the digital controller (10) to measure the state of charge of the battery pack system module using one or more of the measuring devices (22, 23, 24) and display the state of charge on the initializer or display device (50).

The computer instructions (45) can also instruct the processor of the digital controller (10) to actuate and de-actuate the charge switch (13) of the disconnect circuit (12) when the battery pack system module reaches a predetermined state of charge. For example the charge switch (13) can be actuated when a solar cell battery reaches a predetermined state of charge of about 80 percent to about 85 percent relative capacity, the predetermined charge selected to prolong the life of the battery.

The computer instructions (45) can further instruct the processor of the digital controller (10) to actuate and de-actuate the by-pass switches (27a, 27b) of each of the balancing circuits (25a, 25b) when the battery pack system module reaches the predetermined state of charge, thereby at least partially discharging the battery pack system module using the shunt resistors (26a, 26b)

The present system thereby can utilize the shunt resistors (26a, 26b) for the dual purposes of balancing the state of charge of individual cells within the battery pack system module, and for at least partially discharging all cells of the battery pack system module to balance the state of charge of the battery pack system module with that of other battery pack system modules connected in series.

The computer instructions (45) can be contemplated to actuate the shunt resistors (26a, 26b) of each balancing circuit (25a, 25b) when the battery pack system module is charged to a predetermined high state of charge, causing discharge of the battery pack system module, and to de-actuate the shunt resistors (26a, 26b) to cease the discharge of the battery pack system module when the battery pack system module has been discharged to a predetermined hysteresis charge.

For example, when a battery pack system module reaches a predetermined high state of charge of about 85 percent relative capacity, each balancing circuit within the battery pack system module can be actuated to discharge the battery pack system module to a hysteresis charge of about 83 percent relative capacity, at which time the balancing circuits can be de-actuated to cease discharge of the battery pack system module.

Figure 2:
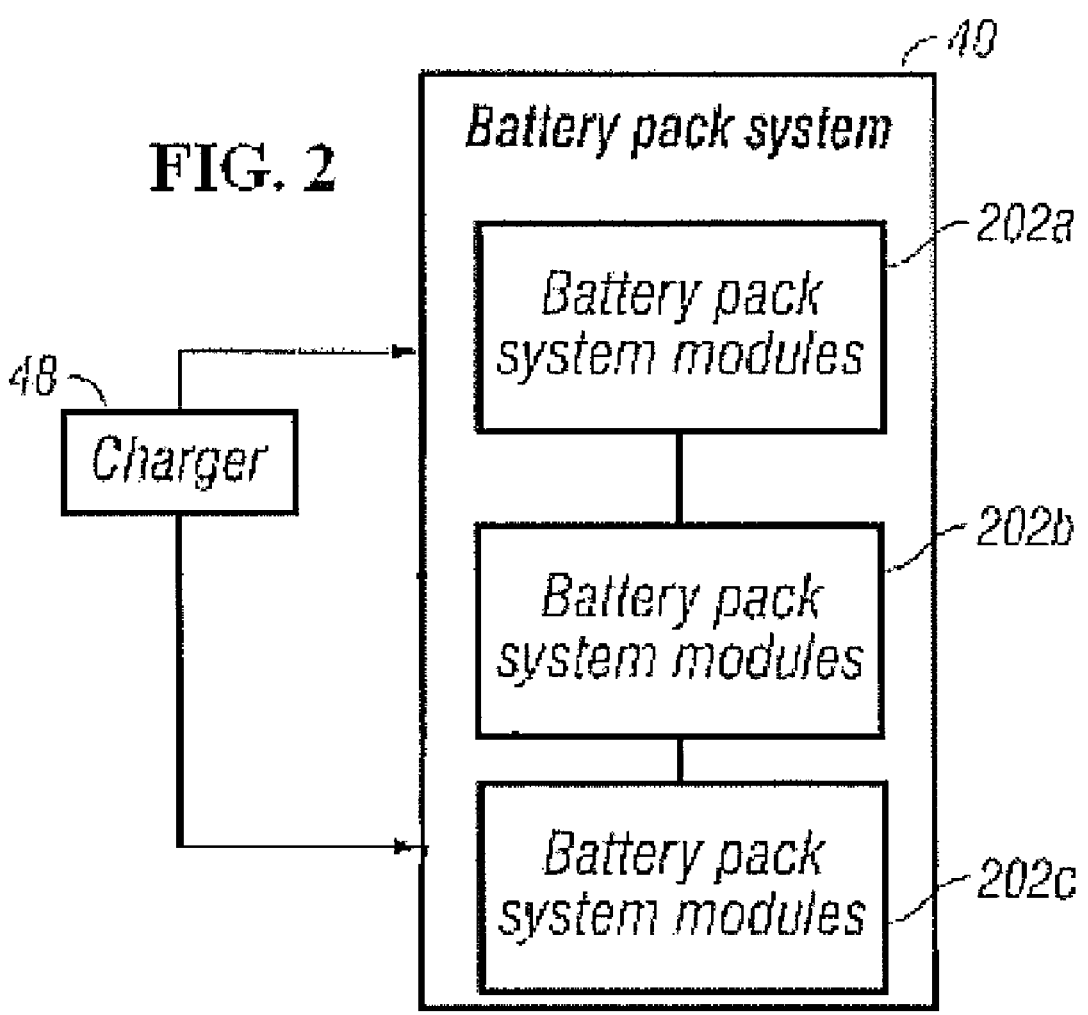
FIG. 2 depicts a diagram of an embodiment of the present system containing battery pack system modules connected in series, each having a zener diode.

Referring now to FIG. 2, a diagram depicting an embodiment of the present system is shown.

FIG. 2 depicts a battery pack system (40), which can include a plurality of battery pack system modules. FIG. 2 shows a first battery pack system module (202a) connected in series with a second battery pack system module (202b), and a third battery pack system module (202c).

While FIG. 2 depicts the battery pack system (40) is shown having three battery pack system modules, it can be contemplated that a battery pack system can include any number of battery pack system modules, such as from about 1 battery pack system module to about 15 battery pack system modules, or more, depending on the voltage requirements of the system.

For example, when a voltage of 200 volts is required in an automobile, a sufficient number of battery pack system modules connected in series, or groups of battery pack system modules connected in parallel that are connected to other groups in series can be provided, that provide a total nominal voltage of at least 200 volts.

Each battery pack system module (202a, 202b, 202c) can include any number of individual cells. In an embodiment, from about one cell to about four cells connected in series can be contained in each battery pack system module, such that each battery pack system module provides a nominal voltage ranging from about 3.7 volts to about 14.8 volts. When fully charged, each battery pack system module can provide from about 4.2 volts to about 16.8 volts, and when empty, from about 3 volts to about 12 volts.

It can be contemplated that one battery pack system module of the plurality of battery pack system modules can be a high charge module, having reached a predetermined level of charge greater than that of other battery pack system modules, such as by about 1 percent to about 50 percent or more when a system is extremely unbalanced, by about 1 percent to about 20 percent when a system is significantly unbalanced, or about 1 percent to about 5 percent when a system is moderately unbalanced. The predetermined level of charge can be the maximum level of charge for the battery pack system module, or another level specified by a user and/or manufacturer, such as about 80 percent relative capacity for the battery pack system module.

For example, a high charge battery pack system module (202a) can be charged to a predetermined high state of charge of about 90 percent relative capacity, while an adjacent battery pack system module (202b) can have a charge of about 89 percent relative capacity, and the next adjacent battery pack system module (202c) can have a charge of about 60 percent relative capacity.

In this situation, current from a charger (48) conducted to the high charge battery pack system module (202a) can bypass the high charge battery pack system module (202a) via a zener diode contained within the high charge battery pack system module (202a) to charge the adjacent battery pack system modules (202b, 202c). When the second battery pack system module (202b) has reached the predetermined level of about 90 percent relative capacity, current from the charger (48) can bypass the second battery pack system module (202b) via a zener diode contained within the second battery pack system module (202b) to charge the third battery pack system module (202c).

Figure 3:
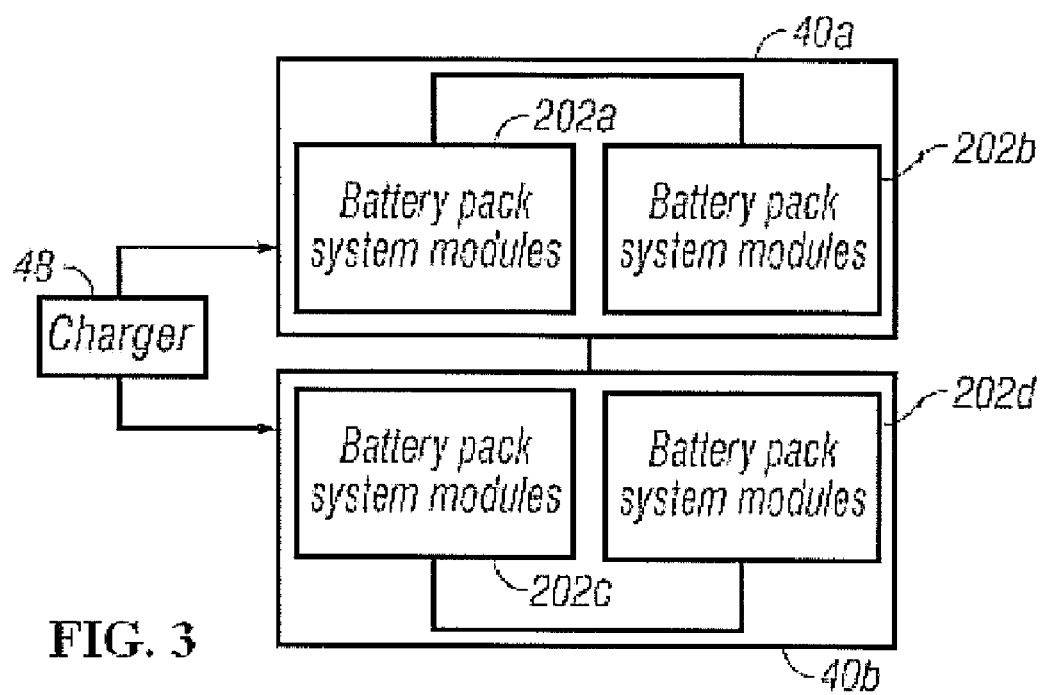
FIG. 3 depicts a diagram of an embodiment of the present system containing groups of battery pack system modules connected in parallel, that are connected to other groups of battery pack system modules in series.

Referring now to FIG. 3, a diagram depicting an alternate embodiment of the present system is shown.

FIG. 3 depicts a first group of battery pack system modules (40a), which can include a first battery pack system module (202a) and a second battery pack system module (202b) connected in parallel.

FIG. 3 also depicts a second group of battery pack system modules (40b), which can include a third battery pack system module (202c) and a fourth battery pack system module (202d) connected in parallel.

The first group of battery pack system modules (40a) can be connected in series with the second group of battery pack system modules (40b).

While FIG. 3 depicts two groups of battery pack system modules connected in series, each group containing two battery pack system modules connected in parallel, it can be contemplated that each group can include any number of battery pack system modules connected in series or in parallel, and that any number of groups of modules can be in turn connected in series or in parallel.

FIG. 3 depicts a charger (48) for providing current to each of the battery pack system modules (202a, 202b, 202c, 202d). In the embodiment, it is contemplated that each battery pack system module can lack a zener diode. It can be contemplated that each battery pack system module can include balancing circuits having shunt resistors. Computer instructions can be within each battery pack system module and can cause the shunt resistors to be actuated when the battery pack system module reaches a predetermined level of charge, causing the battery pack system module to be at least partially discharged.

After partial discharge of the battery pack system module, current from the charger (48) can again simultaneously charge each of the battery pack system modules (202a, 202b, 202c, 202d) until one or more of the battery pack system modules reaches the predetermined state of charge.

For example, if the first and second battery pack system modules (202a, 202b) reach a predetermined state of charge of about 90 percent relative capacity, prior to the third and fourth battery pack system modules (202c, 202d), which have reached about 82 percent relative capacity, the first and second battery pack system modules (202a, 202b) can be partially discharged by a predetermined amount, automatically, through use of computer instructions to actuate balancing circuits.

The first and second battery pack system modules (202a, 202b) can be discharged to a hysteresis value of about 86 percent relative capacity. Then, charging of the entire battery pack system could be resumed, until the first and second battery pack system modules (202a, 202b) again reach about 90 percent relative capacity, while the third and fourth battery pack system modules (202c, 202d) reach about 86 percent relative capacity.

The first and second battery pack system modules (202a, 202b) can again be discharged to about 86 percent relative capacity, and charging of the entire battery pack system would continue until each battery pack system module (202a, 202b, 202c, 202d) reaches the predetermined state of charge of about 90 percent relative capacity. All four battery pack system modules (202a, 202b, 202c, 202d) can then be balanced and would proceed to charge to the predetermined 90 percent capacity and discharge to about 86 percent capacity together, until the charger (48) is disconnected.

Figure 4:
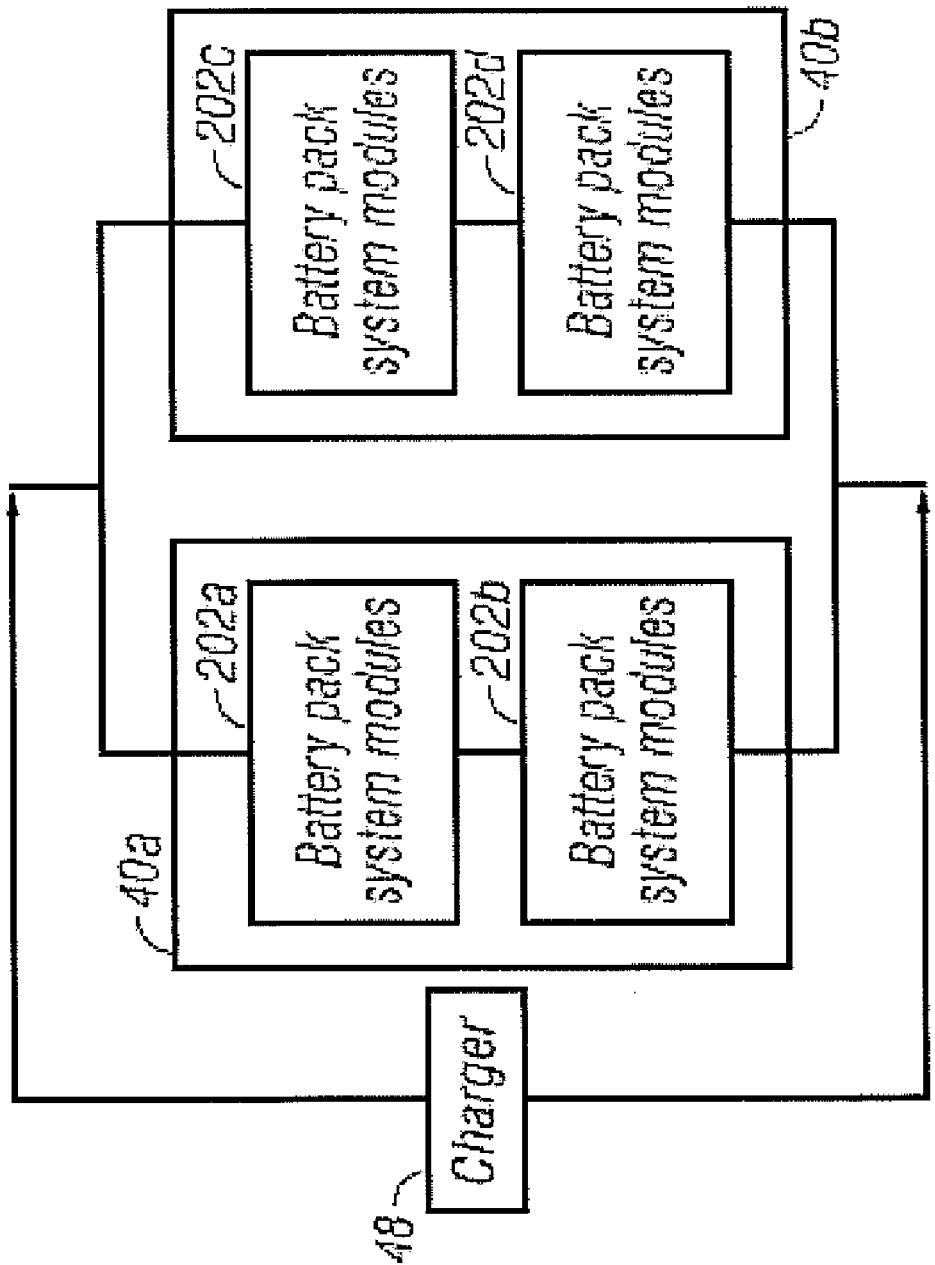
FIG. 4 depicts a diagram of an embodiment of the present system containing groups of battery pack system modules connected in series, that are connected to other groups of battery pack system modules in parallel.

Referring now to FIG. 4, a diagram depicting an alternate embodiment of the present system is shown.

FIG. 4 depicts a first group of battery pack system modules (40a), which can include a first battery pack system module (202a) and a second battery pack system module (202b) connected in series.

FIG. 4 also depicts a second group of battery pack system modules (40b), which can include a third battery pack system module (202c) and a fourth battery pack system module (202d) connected in series.

The first group of battery pack system modules (40a) can be connected in parallel with the second group of battery pack system modules (40b).

A charger (48) is shown for providing current to each group of battery pack system modules (40a, 40b) simultaneously.

It can be contemplated that the design flexibility provided by the present system enables any number of battery pack system modules to be stackable, and to be connected in any number of series and/or parallel configurations to provided a desired amount of voltage.

It can further be contemplated that the design flexibility provided by the present system can enable any individual battery pack system module of similar design to be independently removed and replaced, and selected groups of battery pack system modules to be independently removed and replaced.

Figure 5:
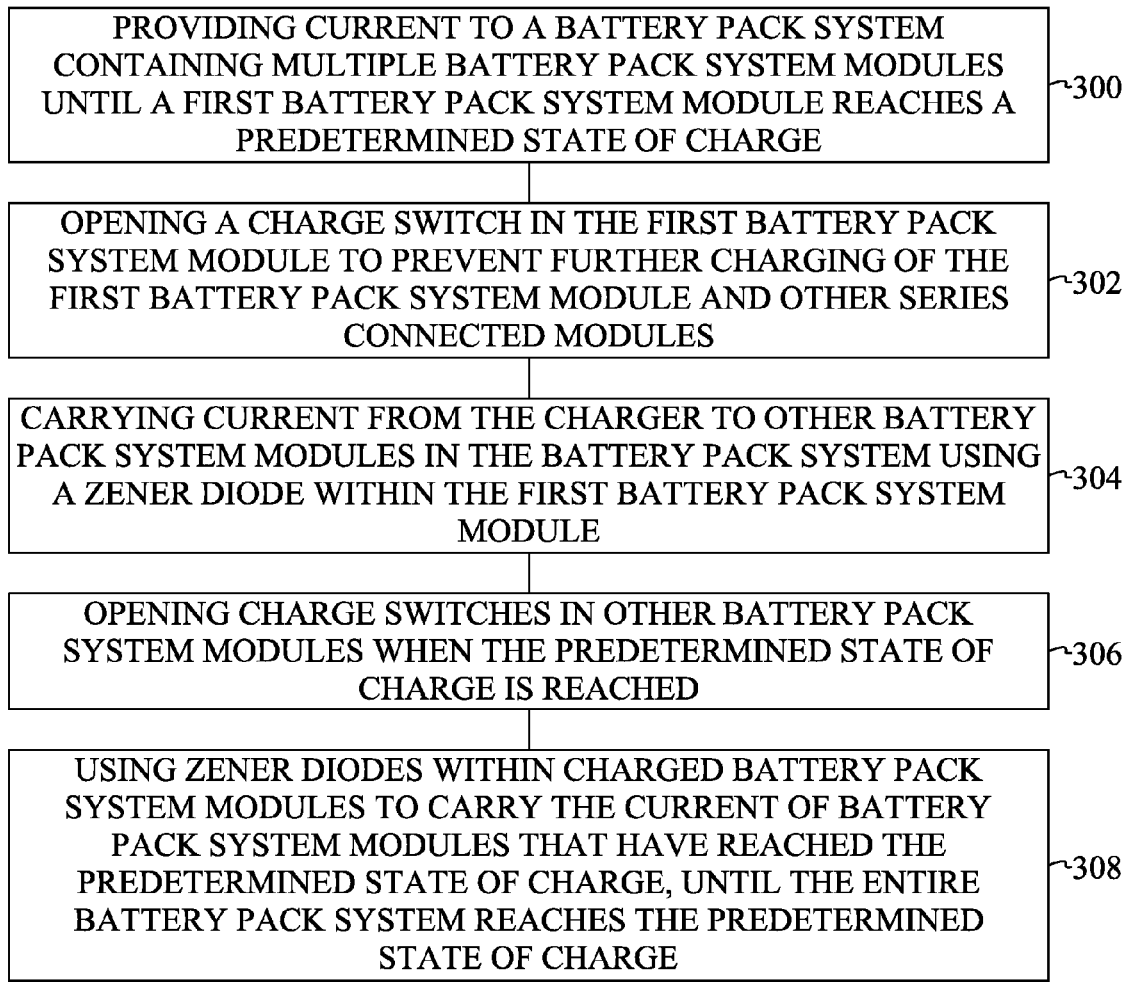
FIG. 5 depicts a diagram of an embodiment of a method useable with an embodiment of the present system.

Referring now to FIG. 5, a diagram showing an embodiment of a method useable with an embodiment of the present system is shown.

FIG. 5 depicts that current can be provided to a battery pack system containing multiple battery pack system modules until a first battery pack system module reaches a predetermined state of charge (300).

Once the first battery pack system module reaches a predetermined state of charge, a charge switch in the first battery pack system module can be opened to prevent further charging of the first battery pack system module and other series connected modules (302).

Current from the charger can be carried to other battery pack system modules in the battery pack system using a zener diode within the first battery pack system module (304), thereby enabling the remaining modules within the battery pack system to continue charging when the first battery pack system module has been disconnected from the charger.

Charge switches in other battery pack system modules can be opened when the other battery pack system modules reach the predetermined state of charge (306).

Zener diodes within each charged battery pack system module can be used to carry the current of the battery pack system modules that have reached the predetermined state of charge, so that the battery back system can continue to be charged until the entire system has reached the predetermined state of charge (308).

Figure 6:
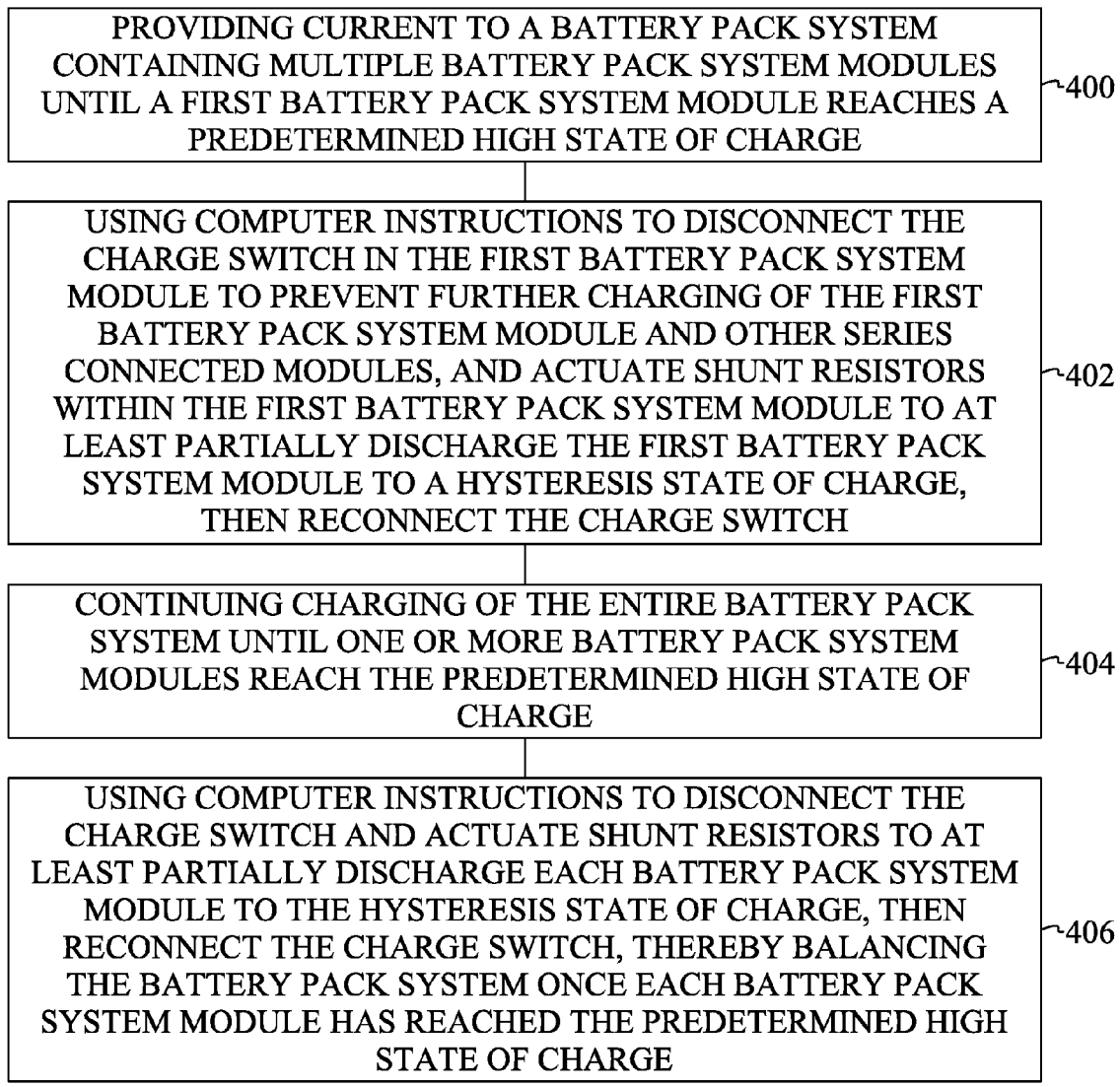
FIG. 6 depicts a diagram of an embodiment of a method useable with an alternate embodiment of the present system.

FIG. 6 depicts a diagram showing an embodiment of a method useable with an alternate embodiment of the present system.

FIG. 6 depicts that current can be provided to a battery pack system containing multiple battery pack system modules until a first battery pack system module reaches a predetermined high state of charge (400).

Computer instructions can be within the first battery pack system module and can then be used to disconnect the charge switch in the first battery pack system module to prevent further charging of the first battery pack system module and other series connected modules, and to actuate shunt resistors within the first battery pack system module to at least partially discharge the first battery pack system module to a predetermined hysteresis state of charge (402). This action can prevent battery pack system module cells from overcharging and provides for initiation of charge/discharge cyclic oscillation.

Continued charging of the first battery pack system module is thereby able to be resumed, then stopped as the first battery pack system module is at least partially discharged in a cyclic charge/discharge oscillating fashion, such that the first battery pack system module oscillates between the predetermined high state of charge and the hysteresis state of charge continuously, as long as a charge source is connected.

Other battery pack system modules that have not obtained the predetermined high state of charge can be charged but not discharged until each reaches the predetermined high state of charge (404).

At that time, computer instructions can be used to actuate shunt resistors within each battery pack system module to at least partially discharge each battery pack system module that reaches the predetermined high state of charge (406). The battery pack system can be balanced once each module has reached the predetermined high state of charge and begins its charge/discharge oscillation.

Once all battery pack system modules within a battery pack system are charged to the predetermined high state of charge, creating a balanced system, it can be contemplated that all of the battery pack system modules exhibit an oscillating state of charge simultaneously, through partial discharge to a hysteresis state of charge using the shunt resistors, then simultaneous charging until the predetermined high state of charge can be again reached.

While these embodiments have been described with emphasis on the embodiments, it should be understood that within the scope of the appended claims, the embodiments might be practiced other than as specifically described herein.

What is claimed is:

1. A system for balancing a plurality of battery pack system modules connected in series, the system comprising:
   a plurality of battery pack system modules connected in series, wherein a high charge module of the plurality of battery pack system modules has a charge greater than a charge for other modules of the plurality of battery pack system modules connected in series;
   at least one zener diode connected in series with a current limiting resistor, wherein the at least one zener diode is disposed between the high charge module and an adjacent battery pack system module of the plurality of battery pack system modules, wherein each of the battery pack system modules comprises a disconnect circuit that has a charge switch that can be opened to prevent further charging of all of the battery pack system modules, wherein the at least one zener diode is in communication with the disconnect circuit of at least one of the plurality of battery pack system modules;
   a plurality of controller assemblies, wherein each battery pack system module comprises a controller assembly from the plurality of controller assemblies and a balancing circuit in communication with the controller assembly disposed within the battery pack system module, wherein the controller assembly disposed in the battery pack system module is in communication with the disconnect circuit disposed in the battery pack system module, and wherein each controller assembly is adapted to open the charge switch of the associated disconnect circuit when the associated battery pack system module reaches a predetermined state of charge, and to balance the associated battery pack system module with the other battery pack system modules within the plurality of battery pack system modules by discharging the battery pack system module having the open charge switch;
   a power source in communication with the disconnect circuits, wherein at least one of the disconnect circuits is actuated when the at least one of the plurality of battery pack system modules reaches a predetermined state of charge, and wherein the disconnect circuit stops current from the power source to the plurality of battery pack system modules;
   wherein current from the power source is limited by the current limiting resistor; and
   wherein the at least one zener diode enables current from the power source to bypass at least one of the plurality of battery pack system modules at the predetermined state of charge to charge at least one other battery pack system module.

2. The system of claim 1, wherein each battery pack system module further comprises a protective diode connected to a plurality of cells connected in series and to the disconnect circuit in the battery pack system module, wherein the protective diode is a reverse voltage protection diode or a bypass diode.

3. The system of claim 1, wherein each disconnect circuit further comprises a discharge switch.

4. The system of claim 1, wherein the controller assembly further comprises configuration memory with design parameters and computer instructions for instructing the processor to customize specifications of the battery pack system module using the design parameters.

5. The system of claim 1, further comprising a display device in communication with each of the controller assemblies, wherein the controller assemblies further comprise computer instructions for instructing the processor to display the state of charge of each battery pack system module on the display device.

6. The system of claim 5, wherein the display device comprises a member of the group consisting of: a plurality of light emitting diodes, a liquid crystal display, a plasma display, and combinations thereof.

7. The system of claim 5, wherein each of the controller assemblies further comprise computer instructions for instructing the processor to display an absolute state of charge for each battery pack system module by counting coulombs.

8. The system of claim 1, wherein the power source comprises a rechargeable battery.

9. The system of claim 8, wherein the rechargeable battery comprises a member of the group consisting of: a lithium ion battery, a nickel cadmium battery, a nickel metal hydride battery, a lead acid battery, and combinations thereof.

10. The system of claim 1, wherein at least one of the battery pack system modules comprises at least one capacitor, at least one supercapacitor, at least one other electrochemical cell, or combinations thereof.

11. The system of claim 1, wherein at least one of the battery pack system modules comprises a plurality of battery pack system modules connected in parallel.

12. The system of claim 11, wherein the plurality of battery pack system modules connected in parallel are further connected in series.

13. The system of claim 12, wherein at least one of the plurality of battery pack system modules is individually replaceable.

14. The system of claim 1, wherein at least one of the battery pack system modules is individually replaceable.

15. A system for balancing a plurality of battery pack system modules connected in series, the system comprising:
   a plurality of battery pack system modules connected in series, wherein a high charge module of the plurality of battery pack system modules has a charge greater than a charge for other modules of the plurality of battery pack system modules connected in series;
   wherein each battery pack system module of the plurality of battery pack system modules comprises:
      at least one balancing circuit comprising a shunt resistor and a bypass switch, wherein the at least one balancing circuit is in communication with a plurality of cells connected in series;

at least one disconnect circuit comprising a charge switch, wherein the at least one disconnect circuit is in communication with the plurality of cells;

a controller assembly in communication with the plurality of cells connected in series, the controller assembly comprising:

a digital controller comprising a processor;

means for monitoring and measuring parameters for the plurality of cells to determine a state of charge for each cell of the plurality of cells;

computer instructions for instructing the processor to actuate and de-actuate the at least one balancing circuit, the at least one disconnect circuit, or combinations thereof, responsive to the parameters for the plurality of cells;

computer instructions for instructing the processor to actuate and de-actuate the charge switch of the at least one disconnect circuit when one of the plurality of battery pack system module reaches a predetermined state of charge;

computer instructions for instructing the processor to actuate and de-actuate the bypass switch of at least one balancing circuit to at least partially discharge the associated battery pack system module when the associated battery pack system module reaches the predetermined state of charge; and a power source in communication with the at least one disconnect circuit, wherein the at least one disconnect circuit and the at least one balancing circuit are actuated when the associated battery pack system module reaches the predetermined state of charge enabling at least partial discharge of the associated battery pack system module, wherein the at least one disconnect circuit stops current from the power source to the plurality of battery pack system modules.

16. A system for balancing a plurality of battery pack system modules connected in series, the system comprising:

a. a first battery pack system module comprising:
  i. a first plurality of cells;
  ii. a first balancing circuit in communication with the first plurality of cells;
  iii. a first disconnect circuit in communication with the first plurality of cells, wherein the first disconnect circuit comprises a first charge switch adapted to be opened to prevent charging of the first battery pack system module and any other battery pack system modules connected in series with the first battery pack system module;
  iv. a first control assembly in communication with the first plurality of cells, the disconnect circuit, and the first balancing circuit, wherein the first control assembly is adapted to open the first charge switch to prevent charging of the first battery pack system module and any series connected battery system modules, and actuate the first balancing circuit to discharge current from the first battery pack system module when the first battery pack system module reaches a predetermined state of charge;

b. a second battery pack system module comprising:
  i. a second plurality of cells
  ii. a second balancing circuit in communication with the second plurality of cells;
  iii. a second disconnect circuit in communication with the second plurality of cells, wherein the second disconnect circuit comprises a second charge switch adapted to be opened to prevent charging of the second battery pack system module and any other battery pack system modules connected in series with the second battery pack system module;
  iv. a second control assembly in communication with second plurality of cells, the disconnect circuit, and the second balancing circuit, wherein the second control assembly is adapted to open the second charge switch to prevent charging of the second battery pack system module and any series connected battery system modules, and actuate the second balancing circuit to discharge current from the second battery pack system module when the second battery pack system module reaches a predetermined state of charge; and c. a charger power source in communication with the series connected first and second battery pack system modules.

* * * * *